July 3, 1934.  C. BROWN  1,965,451

VEHICLE

Filed Aug. 1, 1929  3 Sheets-Sheet 1

INVENTOR
CARLETON BROWN
BY Featherstonhaugh & Co
ATTORNEYS

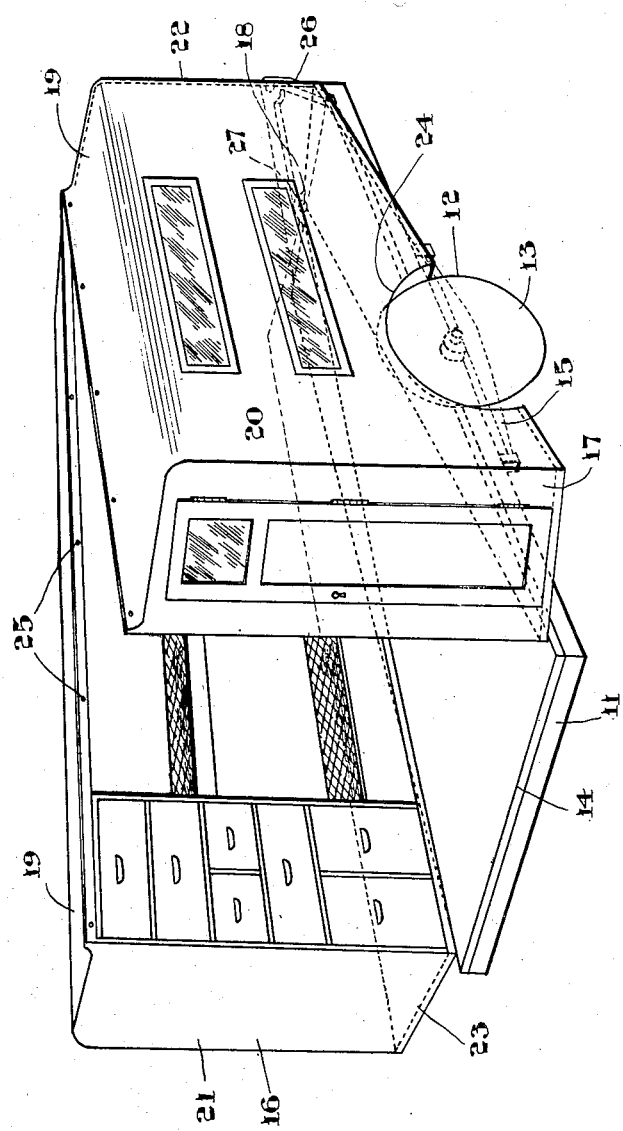

July 3, 1934.  C. BROWN  1,965,451
VEHICLE
Filed Aug. 1, 1929   3 Sheets-Sheet 3
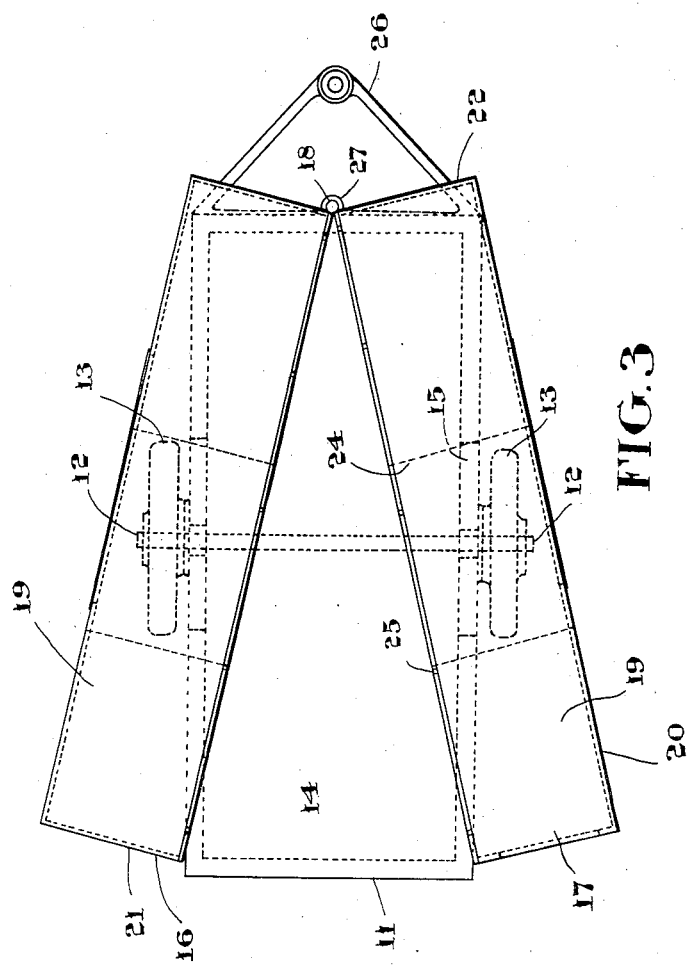
INVENTOR
CARLETON BROWN
Featherstonhaugh & Co
ATTORNEYS Patented July 3, 1934

1,965,451

UNITED STATES PATENT OFFICE 1,965,451

VEHICLE

Carleton Brown, Westmount, Quebec, Canada

Application August 1, 1929, Serial No. 382,622

7 Claims. (Cl. 296—26)

This invention relates to new and useful improvements in powered and unpowered vehicles and particularly to the construction of the body thereof and the object of the invention is to provide a vehicle body which may be conveniently split and expanded when desired. The body of the vehicle during its mobile state is substantially the same width as an ordinary motor vehicle but when desired the entire body may be completely split into a plurality of sections, preferably two. Through the expansion of the body the floor area is increased by about 50% thereby providing ample space for the installation within the body sections of devices useful for touring, pleasure and commercial purposes. The invention herein described is a modified form of the vehicle body described in my co-pending application, Serial No. 379,794.

According to my invention, I take any powered or unpowered portable chassis and mount thereon a floor, preferably a permanent fixed floor, covering substantially the area encompassed by the chassis or frame. This floor functions as part of the floor when my vehicle body has been split into two or more sections and moved apart into their relatively expanded positions. The vehicle body is superposed upon the chassis floor and each body section is preferably provided with a floor of its own. The body is built in a plurality of sections, preferably two and is so designed that when the two sections are temporarily joined together they mate or interlock, the joint between the sections being preferably but not necessarily in the longitudinal direction of the vehicle. Each half body or split body is an integral unit which consists of its own respective floor, walls and roof. These half bodies are mounted above the chassis and they are joined together temporarily, the joint taking place where the floors, walls and roofs meet. The two half bodies thereupon become a whole body and I may provide in the walls and roofs of same, suitable apertures for windows, doors, ventilators and the like. The two split bodies are pivotally secured at one end to each other and/or to the chassis or frame. The two split bodies having been joined together by bolts or the like are then bolted or otherwise secured to the chassis frame.

When expansion is desired, the fastening bolts are loosened and the body is then split into two sections so that they can be swung on their pivotal connections radially from the pivot and substantially transversely of the vehicle chassis. This movement of the body sections or half bodies increases the living or storing space of the vehicle by approximately 50%. Suitable means may be provided for supporting the parts of the split body which overlie beyond the sides of the chassis frame, when in the expanded position.

In the drawings which illustrate the preferred form of my invention:

Figure 2 is a perspective view of the vehicle shown in Figure 1 in its expanded state with the half bodies split and expanded to increase the accommodation of same.

Figure 3 is a plan view of the body with the split portions thereof in their expanded position as shown in Figure 2.

Figure 1:
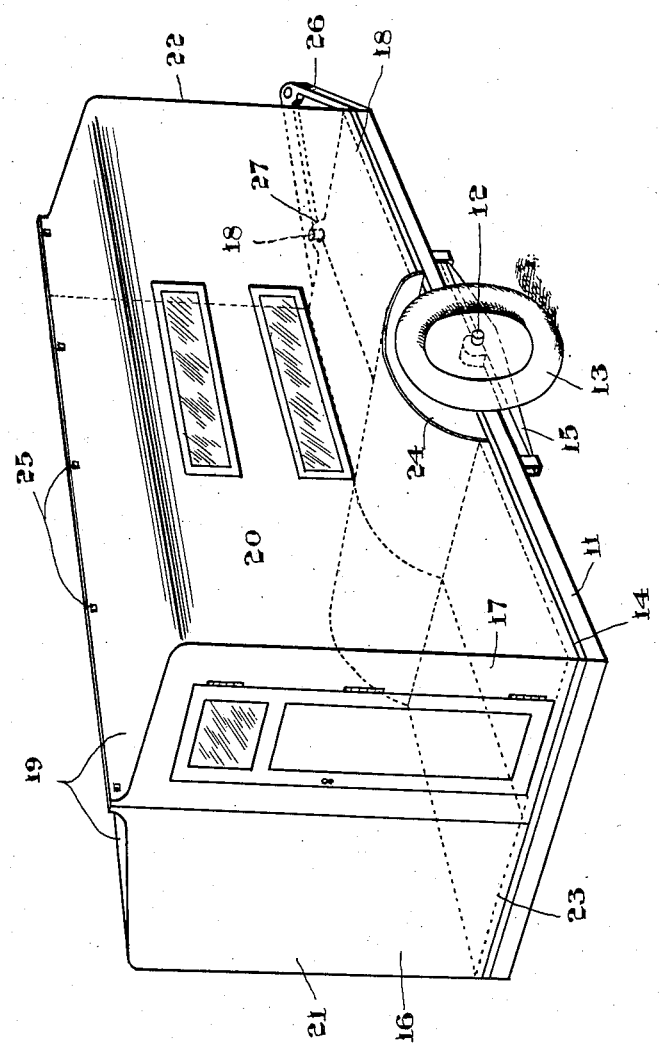
Figure 1 is a perspective view of my improved vehicle in the form of a trailer adapted for connection to a source of locomotion. This figure shows the vehicle in its mobile or travelling state.

The figures shown are for illustrative purposes only and it will be readily understood that the invention herein described is not confined to a trailer but may be adapted to any type of powered or unpowered vehicle having two or more wheels.

Referring more particularly to the drawings, 11 designates the chassis or frame of the vehicle which is mounted on the axle 12. The wheels 13 are secured to the ends of the axle. Secured to the chassis is the fixed floor 14 which as shown covers substantially the entire area of the chassis or frame. A resilient connection such as the springs 15 may be made between the axle and the underside of the chassis or frame. The body as shown is split into two half bodies 16 and 17. These halves are connected at one end to a pivot pin 18 extending upwardly from the chassis. The pivot pin is only illustrative of one type of pivotal connection which may be made between the half bodies and the frame. Many other types of connections may be made to allow the same movement between the half bodies without departing from the spirit of the invention.

Each half body comprises a roof portion 19, a side 20, ends 21 and 22 and a floor 23. A wheel well 24 is formed in each floor to clear the wheel when the half bodies are in their extended or expanded positions. These wheel wells may be of any required size of contour to allow the half bodies to clear the wheels. The abutting edges of the roofs, ends and floors, when in the position shown in Figure 1 are preferably at the center of the vehicle and substantially at right angles to the axle. This means that the two half bodies which constitute the body of the vehicle, are joined centrally in the longitudinal direction by bolts 25, or like fastening means, when in its mobile or travelling condition, as shown clearly in Fig. 1. It will be seen that the roof portions are preferably arranged so that they slope downwardly from the line of contact at the center towards the sides thereof, so that rain may be shed therefrom. In the drawings, the shape of each roof portion is shown in ogee or reverse curve form with the central portion of same at a greater elevation than the sides, thus forming a central peak through which fastening bolts may be passed. In like manner, the walls and floors may be joined through flanges extending inwardly of the body sections. The half-bodies are slidably mounted on the floor of the chassis preferably upon suitable anti-friction bearings. The chassis, which is shown, is illustrative of the trailer type and a link coupling 26 is shown for connecting it to a source of locomotion such as an automobile, or any other vehicle. This coupling is shown as a casting with a lug 27 in which the pivot pin 18 may be mounted for fastening the adjacent ends of the half bodies to one another, and, when required, to the chassis. Other types or pivotal connections may be made. During the mobile or travelling state, the half bodies are preferably transported in a united and sealed condition, that is, with the two half bodies firmly connected together, so that the width is substantially the same width as a vehicle proper, see Figure 1. In this condition, the floors, of the half bodies overlie the floor of the chassis.

When the split bodies are about to be expanded, the connecting bolts are withdrawn and the half bodies are swung about the pivot pin and assume the position shown in Figure 2. As each half body is substantially the same weight as its mate, the equilibrium of the vehicle remains substantially constant. It is obvious that when the half bodies are split and swung apart, a space is created thereby subjecting the interior to rain or inclemencies of the weather. A temporary roof covering may be stretched between the roof peaks and the space between the adjacent ends may be closed by any suitable means to keep the interior of the vehicle weatherproof.

Whereas the drawings have depicted my split bodies as being extended by pivoting from one end, it will be readily understood that the pivoting may be done from the other end or by splitting the body in the transverse direction and pivotally connecting the thus formed half bodies at either side to the chassis. It will be obvious that the half bodies may be separated at any angle relatively to each other.

The interior of the half bodies may, of course, be fitted with beds, cupboards, cooking appliances, or any devices which may be useful for touring, pleasure or commercial purposes.

This type of split body may be applied to a truck, autobus, or any type of frame or chassis, portable or stationary.

The overhanging sections of the half bodies may be supported by any desired means such as jacks or the like.

Having thus described my invention, what I claim is:

1. In a vehicle, a chassis having a fixed floor, a body mounted above the fixed floor and split longitudinally into two sections, each section having its own floor means hingedly connecting the sections together and to one end of the chassis, and means for rigidly connecting the sections together.

2. In a vehicle, a fixed floor, a movable floor, said floor being made in sections and mounted upon the fixed floor, said sections being adapted to meet at the approximate longitudinal center of the fixed floor, means for pivotally connecting corresponding ends of the movable floor sections to the fixed floor to allow said movable floor section to be moved angularly with respect to the longitudinal center, and a wall structure carried by each of the movable floor sections comprising an outer side wall and end walls located at opposite ends of said side wall.

3. A vehicle comprising a frame equipped with a floor, a split body mounted on said floor, the sections of the body being provided with floors independently of the first mentioned floor and being relatively movable about a vertical axis located at one end of the frame.

4. A vehicle body comprising a frame equipped with a floor, a body mounted on said floor and split to provide separable sections having corresponding ends pivotally secured together and to said frame, each of said sections having a floor independently of the first mentioned floor adapted to project beyond the first mentioned floor in the outwardly swung position of said sections.

5. A vehicle comprising a frame equipped with a floor, two complete half body sections pivotally mounted on said floor, means permitting said sections to be swung outwardly with reference to one another so that the floor portions of said sections are projected beyond the first mentioned floor to increase the overall floor area of the vehicle, and means for securing said sections together in abutting relation.

6. A vehicle comprising a frame equipped with a floor, a body mounted on said floor, said body being split longitudinally to provide two complete half sections, each having a floor, an outer side wall, end walls, and a roof element, said sections being hingedly connected together for swinging movement about a vertical axis located at one end of the frame.

7. An expansible trailer of the two wheel type comprising a chassis equipped with a floor, a transverse axle crossing the central portion of the chassis and equipped with a pair of supporting wheels, a longitudinally split body mounted on the chassis floor and presenting two complementary half sections, each section having a floor, end walls and an outer side wall, said sections being hingedly connected to swing about a vertical axis located at one end of the body and each section being provided at a point intermediate its length with a wheel well for clearing the adjacent supporting wheel during swinging movement of the section, said sections being normally disposed with their inner edges abutting along the center line of the chassis but being capable of swinging movement about said vertical axis to a body expanding position in which the floors of the sections are projected beyond opposite sides of the chassis floor in overlapping relation therewith.

CARLETON BROWN.